(12) United States Patent
Foster

(10) Patent No.: US 8,152,094 B2
(45) Date of Patent: Apr. 10, 2012

(54) ENGINE MOUNTING APPARATUS

(75) Inventor: Lawrence David Foster, Toulouse (FR)

(73) Assignee: Rolls-Royce PLC (GB)

( * ) Notice: Subject to any disclaimer, the term of this patent is extended or adjusted under 35 U.S.C. 154(b) by 507 days.

(21) Appl. No.: 12/480,220

(22) Filed: Jun. 8, 2009

(65) Prior Publication Data

US 2009/0308972 A1    Dec. 17, 2009

(30) Foreign Application Priority Data

Jun. 11, 2008 (GB) ................................. 0810585.0

(51) Int. Cl.
B64D 27/26 (2006.01)

(52) U.S. Cl. .............................. 244/54; 60/796; 248/554

(58) Field of Classification Search ................ 244/54; 248/554–557; 60/796, 797
See application file for complete search history.

(56) References Cited

U.S. PATENT DOCUMENTS

| | | | | |
|---|---|---|---|---|
| 5,275,357 | A | | 1/1994 | Seelen et al. |
| 5,320,307 | A | * | 6/1994 | Spofford et al. ............... 244/54 |
| 5,351,930 | A | * | 10/1994 | Gwinn et al. ................ 248/557 |
| 5,725,181 | A | * | 3/1998 | Hey ................................ 244/54 |
| 5,871,175 | A | * | 2/1999 | Demouzon et al. ............. 244/54 |
| 5,871,176 | A | * | 2/1999 | Demouzon et al. ............. 244/54 |
| 5,873,547 | A | * | 2/1999 | Dunstan ......................... 244/54 |
| 6,059,227 | A | | 5/2000 | Le Blaye et al. |
| 6,341,746 | B1 | | 1/2002 | Pascal et al. |
| 6,758,438 | B2 | * | 7/2004 | Brefort et al. .................. 244/54 |
| 7,021,585 | B2 | * | 4/2006 | Loewenstein et al. .......... 244/54 |
| 7,108,224 | B2 | * | 9/2006 | Pasquer et al. ................ 244/54 |
| 7,438,262 | B2 | * | 10/2008 | Chamberlain ................. 244/54 |
| 7,566,029 | B2 | * | 7/2009 | Dron et al. ..................... 244/54 |
| 7,607,609 | B2 | * | 10/2009 | Levert ............................. 244/54 |
| 2001/0025902 | A1 | * | 10/2001 | Jule et al. ........................ 244/54 |
| 2003/0025033 | A1 | | 2/2003 | Levert et al. |
| 2003/0066928 | A1 | | 4/2003 | Brefort et al. |
| 2004/0251380 | A1 | * | 12/2004 | Pasquer et al. ................. 244/54 |
| 2005/0067528 | A1 | * | 3/2005 | Loewenstein et al. .......... 244/54 |
| 2006/0219841 | A1 | * | 10/2006 | Dron et al. ..................... 244/54 |
| 2007/0138337 | A1 | | 6/2007 | Audart-Noel et al. |
| 2010/0116926 | A1 | * | 5/2010 | Combes et al. ................ 244/54 |
| 2010/0127117 | A1 | * | 5/2010 | Combes et al. ................ 244/54 |
| 2010/0127118 | A1 | * | 5/2010 | Combes et al. ................ 244/54 |
| 2011/0001002 | A1 | * | 1/2011 | Chouard et al. ................ 244/54 |
| 2011/0114786 | A1 | * | 5/2011 | Guillet et al. .................. 244/54 |

FOREIGN PATENT DOCUMENTS

| | | |
|---|---|---|
| EP | 0564126 A1 | 10/1993 |
| EP | 1129942 A3 | 12/2001 |
| EP | 2133268 A2 * | 12/2009 |
| EP | 2133269 A2 * | 12/2009 |

* cited by examiner

Primary Examiner — Tien Dinh
Assistant Examiner — Joseph W Sanderson
(74) Attorney, Agent, or Firm — McCormick, Paulding & Huber LLP

(57) ABSTRACT

An engine mounting apparatus that includes thrust struts, a balance yoke, and primary and secondary mount blocks. The thrust struts are connected to the balance yoke and the primary mount block has at least one thrust load connection connectable to the balance yoke for transferring thrust loads from an engine during normal operation of the engine mounting apparatus. The engine mounting apparatus is characterized in that the secondary mount block is connected to the balance yoke via at least one thrust load catcher connection, the at least one thrust load catcher connection being arranged to be unloaded during normal operation of the engine mounting arrangement and to transfer the thrust loads from the engine in the event of a failure condition of the primary mount block.

11 Claims, 6 Drawing Sheets

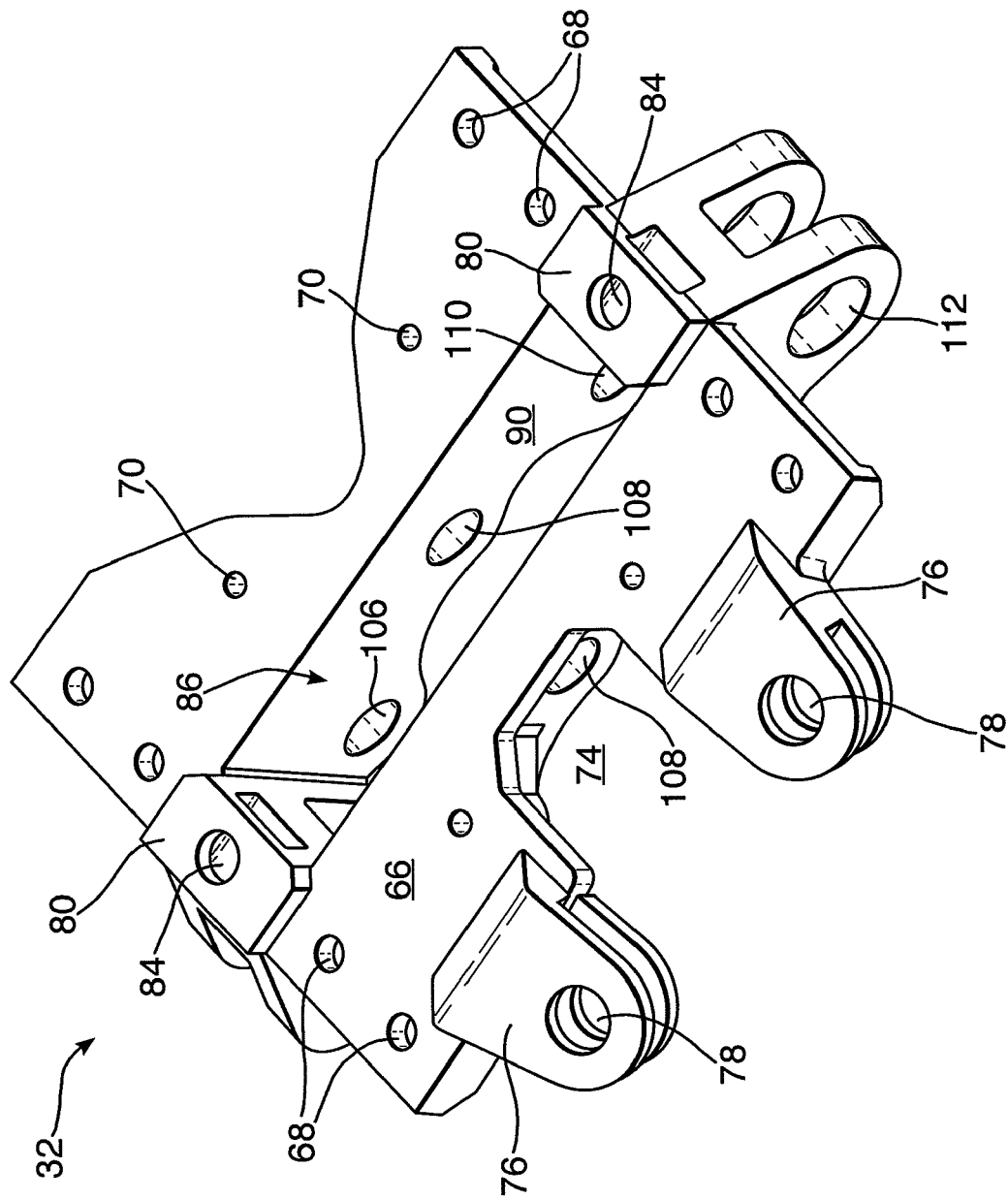

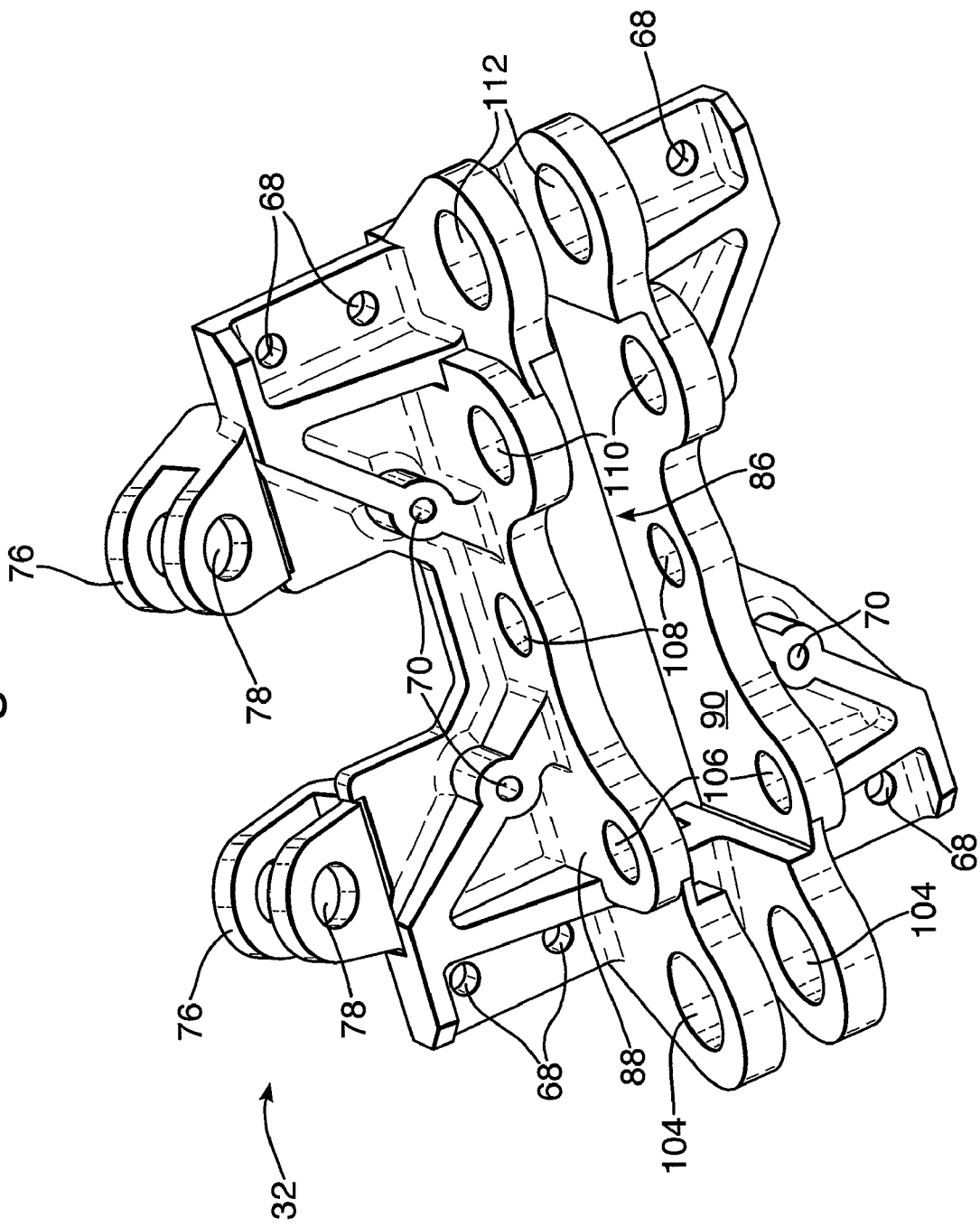

ENGINE MOUNTING APPARATUS

CROSS REFERENCE TO RELATED APPLICATION

This application is entitled to the benefit of British Patent Application No. GB 0810585.0, filed on Jun. 11, 2008.

FIELD OF THE INVENTION

The present invention relates to an engine mounting apparatus and is particularly concerned with a mounting apparatus for attaching an aircraft engine to an aircraft pylon.

BACKGROUND OF THE INVENTION

A gas turbine engine 210 is shown in schematic section in FIG. 1 and comprises a main rotational axis 208, an air intake 212 and a propulsive fan 214 that generates two airflows A and B. The gas turbine engine 210 includes, in axial flow A, an intermediate pressure compressor 216, a high pressure compressor 218, a combustor 220, a high pressure turbine 222, an intermediate pressure turbine 224, a low pressure turbine 226 and an exhaust nozzle 228. A nacelle 230 surrounds the gas turbine engine 210 and defines, in axial flow B, a bypass duct 232 between the air intake 212 and an exhaust nozzle 234. A rear engine mounting apparatus 22 (rear in the sense of airflows A and B) is shown in the vicinity of the turbines 222, 224, 226. Thrust struts 26 interconnect the rear engine mounting apparatus 22 with a forward section of the engine 210. The rear engine mounting apparatus 22 is connectable to an aircraft pylon (not shown). The rear engine mounting apparatus 22 is located at a radially outer extent of the engine 210. Preferably, at top dead centre. For the purposes of the following description, this will be taken to be vertically above the engine although it should be understood that the engine 210 may be hung at an angle to the vertical.

Referring to FIG. 2, which shows in schematic perspective view a conventional rear engine mounting apparatus 22 for mounting an engine 210 on an aircraft, whether under a wing or against a fuselage. It is conventional to provide each of a front and a rear mounting arrangement. Where the engine is a gas turbine engine 210, the front mounting is generally provided in the vicinity of the fan 214 or compressors 216, 218 and the rear mounting is generally provided in the vicinity of the turbines 222, 224, 226. However, other arrangements are possible. The rear mounting apparatus 22 has means for connection of thrust struts 26 to transfer the thrust generated by the engine 210 through the mounting apparatus 22 and the pylon to the aircraft. Typically a forward engine mounting apparatus (not shown) is also provided. Preferably, in the vicinity of the compressors of a gas turbine engine 210 to transfer engine side and vertical loads but not thrust loads.

A conventional rear engine mounting apparatus 22 is shown in FIG. 2 in highly schematic form. The arrangement has a mount block 10 that includes means to attach it both to the aircraft pylon and to the engine 210. It further has an integral clevis arrangement 12 protruding forward from the main body of the mount block 10. The clevis arrangement 12 has a main thrust connection 14, which is connectable to a thrust yoke 16 by a pivot pin or similar. The yoke 16 is connected to the thrust struts 26 (FIG. 1) at connection points 18 by pin and clevis arrangements. Thus, the propulsive thrust loads are transferred from the engine through the thrust struts 26, yoke 16, main thrust connection 14 and mount block 10 and from thence into the pylon of the aircraft.

The clevis arrangement 12 further includes a pair of catcher devises 20 located on either side of the main thrust connection 14. These have a clearance around their respective pivot pins so that in normal operation of the engine mounting apparatus 22 no thrust loads are transferred through the catcher devises 20 and pins. In the event of a failure of the main clevis 14, the clearance is taken up around one or both of the catcher pivot pins and one or both of the catchers 20 transfer the thrust loads in preference or addition to the main thrust connection 14.

One disadvantage of this engine mounting apparatus is that a failure crack emanating from either the engine attachment mechanism or the main thrust connection clevis 14 can propagate to fail an adjacent clevis without detection. Whilst this can be certified by crack growth and propagation analysis, this is an unsatisfactory solution since it requires heavier and stronger materials to ensure the minimal crack growth properties required.

Thus, it is desirable to have an engine mounting apparatus that has a failure load path that does not rely on crack growth and propagation analysis.

SUMMARY OF THE INVENTION

The present invention seeks to provide a novel rear engine mounting apparatus that seeks to address the aforementioned problems.

Accordingly, the present invention provides an engine mounting apparatus includes thrust struts, a balance yoke, and primary and secondary mount blocks, the thrust struts being connected to the balance yoke and the primary mount block having at least one thrust load connection connectable to the balance yoke for transferring thrust loads from an engine during normal operation of the engine mounting apparatus, characterised in that that the secondary mount block is connected to the balance yoke via at least one thrust load catcher connection, the at least one thrust load catcher connection being arranged to be unloaded during normal operation of the engine mounting apparatus and to transfer the thrust loads from the engine in the event of a failure condition of the primary mount block.

Preferably, the primary and secondary mount blocks are secured together.

Preferably, the primary mount block includes a single thrust load connection.

Preferably, the apparatus further has at least one engine attachment link, each of the primary and secondary mount blocks having a connection mechanism to the at least one engine attachment link. More Preferably, at least part of the means of connection of the primary and secondary mount blocks connects to a common part of the at least one engine attachment link.

Preferably, the thrust load connection includes a clevis arrangement having two lugs. Alternatively it has a single lug.

Preferably, the thrust load catcher connection includes a clevis arrangement having two lugs. Alternatively, it has a single lug.

More preferably, there are two thrust load catcher connections arranged to transfer the thrust loads from the engine, either separately or in unison during a failure condition of the primary mount block.

Preferably, the at least one thrust load catcher connection defines a clearance with respect to the balance yoke so that no load passes therethrough during normal operation of the engine mounting arrangement.

BRIEF DESCRIPTION OF THE DRAWINGS

FIGS. 5 and 6 are a pair of perspective views of the secondary mount block of the rear engine mounting arrangement according to the present invention.

DETAILED DESCRIPTION OF THE PREFERRED EMBODIMENTS

Figure 1:
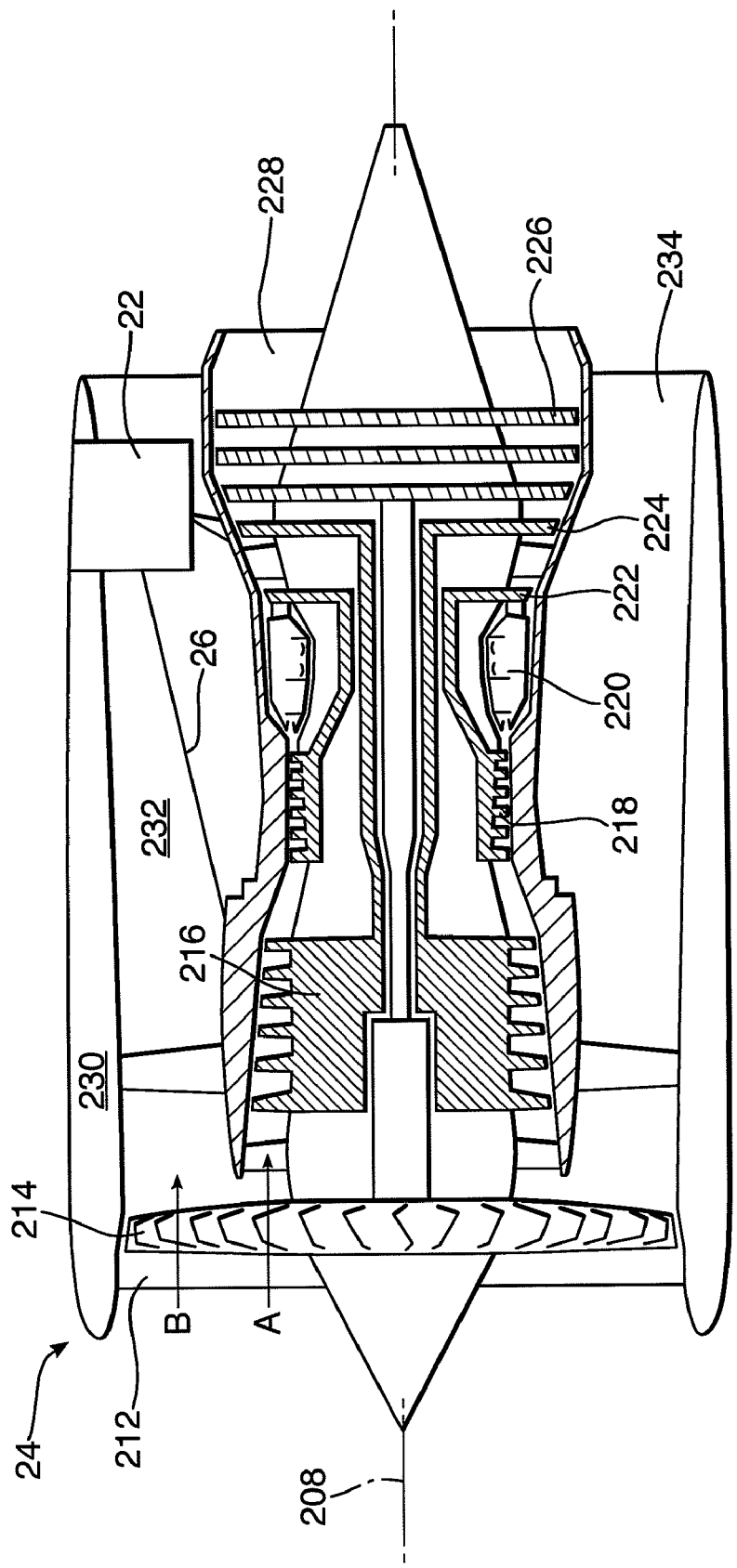
FIG. 1 is a sectional side view of a gas turbine engine having a conventional rear engine mounting apparatus.
Figure 2:
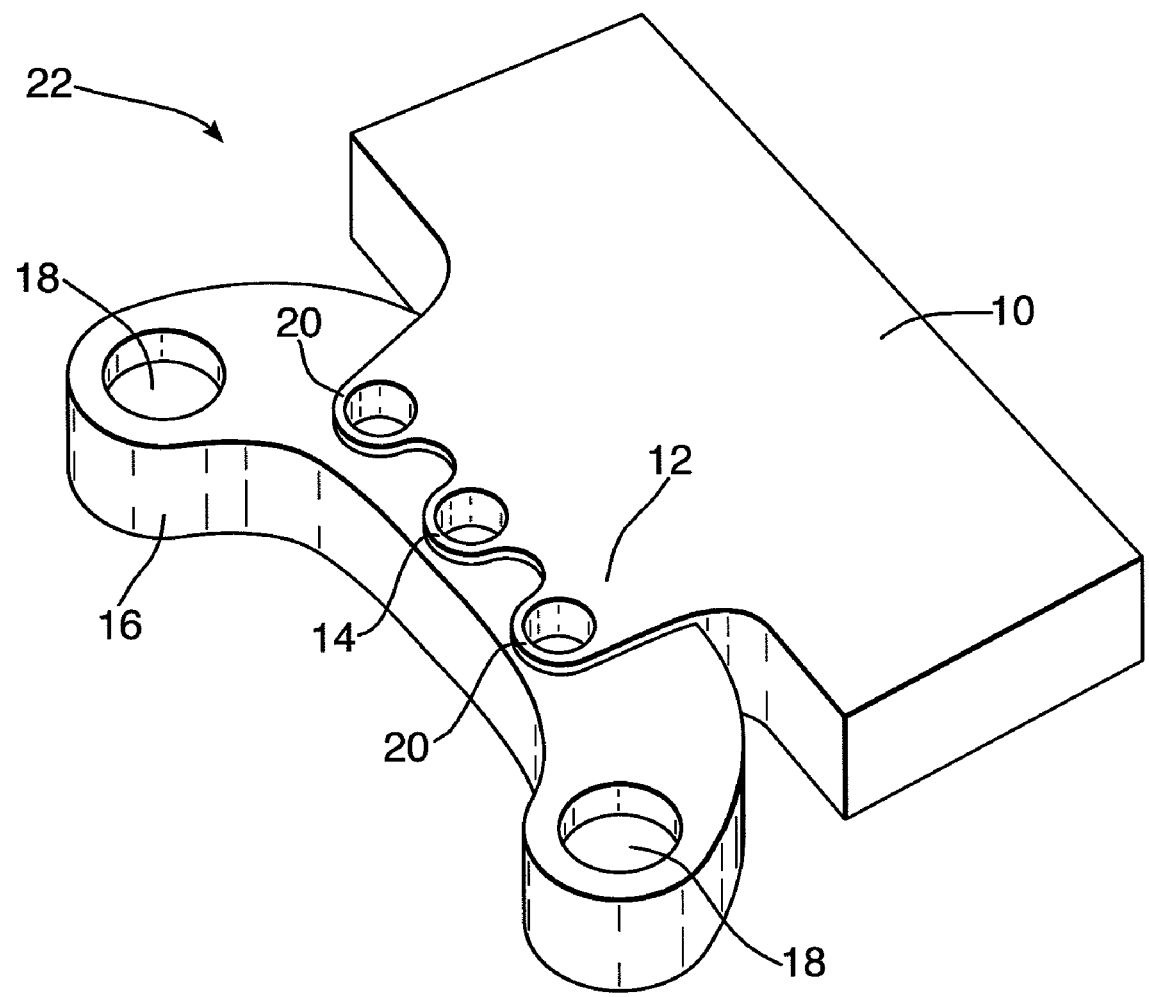
FIG. 2 is a highly schematic perspective view of an engine mounting apparatus according to the prior art as described above.
Figure 3:
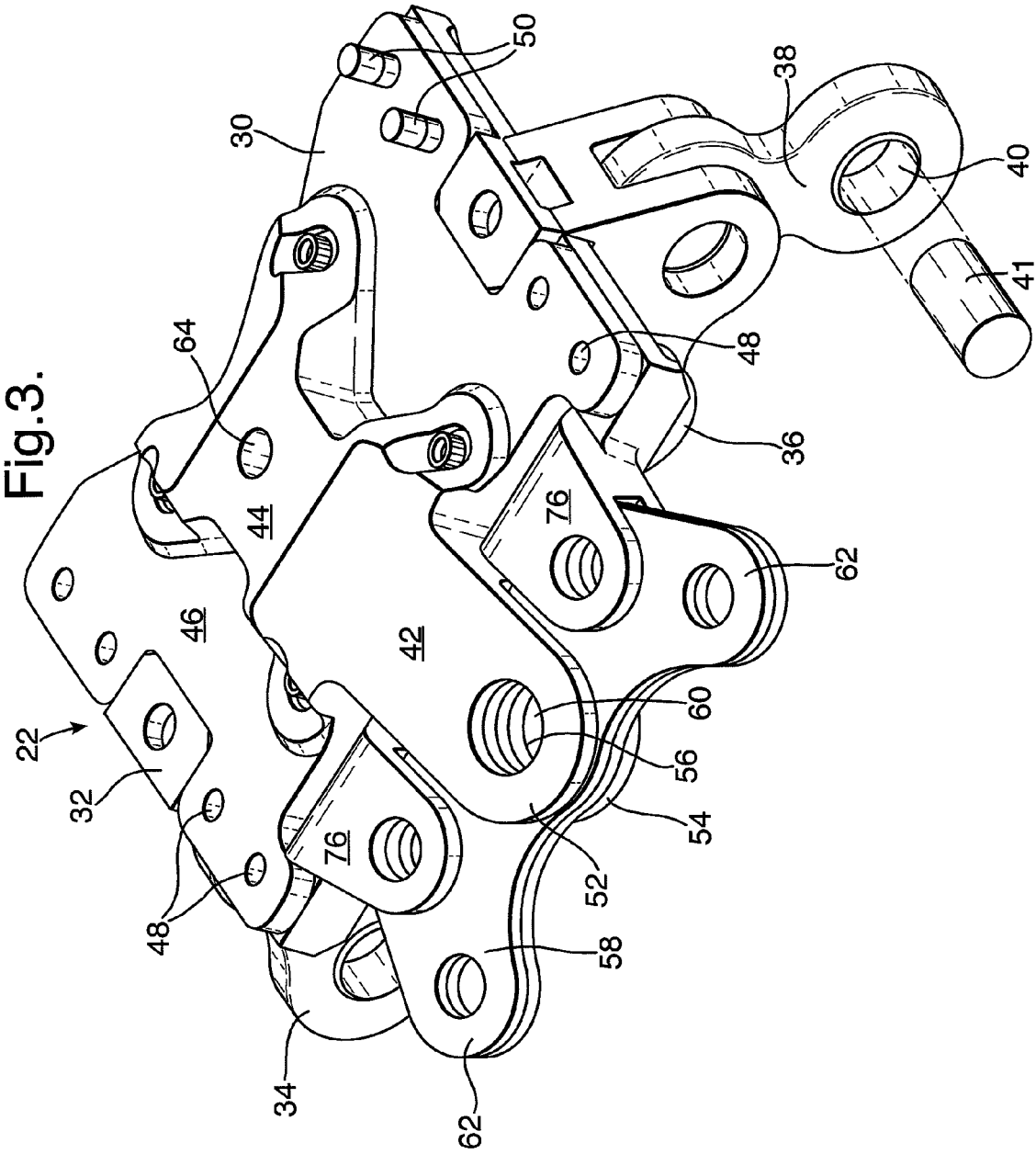
FIG. 3 is a perspective view of a rear engine mounting arrangement according to the present invention.

An exemplary embodiment of the rear engine mounting apparatus 22 of the present invention is shown in FIG. 3. The apparatus 22 has a primary mount block 30 and a secondary mount block 32 secured together. There are three engine attachment links, 34, 36, 38, which interconnect with corresponding attachment points on the engine 210 to one or both of the primary and secondary mount blocks 30, 32 as elaborated later. Preferably, the engine attachment links 34, 36, 38 are connected to points on the engine 210 by a clevis and pin arrangement. For example, as shown in FIG. 3, the port side attachment link 38 is generally longitudinal and comprises an aperture 40 containing a spherical bearing which, in use, sits within a complementary clevis fixed at a suitable location on a casing of the engine. A pin 41 is inserted through the aperture 40 in the port side attachment link 38 (as shown by interrupted lines) and a complementary aperture in the clevis to connect them together. A similar apparatus is provided for each of the starboard side 34 and central 36 attachment links. The arrangement of connection of the engine attachment links 34, 36, 38 to the primary and secondary mount blocks 30, 32 will be described below.

An advantage of providing a clevis and pin arrangement between the engine 210 and the rear engine mounting apparatus 22 is that differential thermal expansion does not place undue stress or strain on any of the components as some relative movement is permitted in at least one plane. However, other arrangements of connecting the engine attachment links 34, 36, 38 to the engine 210 are considered to fall within the scope of the present invention.

The primary mount block 30 of the rear mounting apparatus 22 of the present invention is now described with reference to FIG. 3 (showing both the primary and secondary mount blocks 30, 32) and FIG. 4 (showing just the primary mount block 30). The primary mount block 30 presents a substantially rectangular profile and includes a main portion 46 and a central portion 44 with a tongue 42 protruding forwardly from the central portion 44 of the block 30. The central portion 44 of the primary mount block 30, extending rearwardly of the tongue 42, is raised above the otherwise substantially planar main portion 46. In other embodiments the central portion 44 may be substantially planar with the main portion 46. The central portion 44 may be separate to or integral with the main portion 46 of the primary mount block 30; in this embodiment the central 44 and main 46 portions are integral. The primary mount block 30 defines a plurality of apertures 48 therethrough (of which only some are indicated for clarity) that receive, in use, attachment bolts 50 (only two of which are shown) to connect the primary mount block 30 to the aircraft pylon and to the secondary mount block 32. Preferably, the apertures 48 are located in an equally spaced row parallel to each lateral edge of the primary mount block 30. The number of apertures 48 required will depend on the geometries and forces involved in mounting a particular engine 210 to a particular pylon. However, in the typical rear engine mounting apparatus 22 shown, there are four apertures 48 provided parallel to each lateral edge of the primary mount block 30 each arranged to receive an attachment bolt 50.

The tongue 42 is Preferably, provided in the form of a clevis having upper 52 and lower 54 lugs, which define apertures 56 therethrough, the apertures 56 are aligned to receive a pivot pin (not shown) through the plane of the lugs 52, 54. A thrust strut balance yoke 58 is located symmetrically within the clevis of the tongue 42 and comprises an aperture 60 therethrough that aligns with the apertures 56 through the tongue 42. The pivot pin therefore connects the thrust strut balance yoke 58 within the tongue 42. A clearance is provided between the thrust strut balance yoke 58 and the rear of the clevis formed by the tongue 42, in the plane of the thrust strut balance yoke 58 and the tongue 42, to enable the thrust strut balance yoke 58 to pivot around the pivot pin through apertures 56, 60 to balance the loads from the thrust struts 26.

The two thrust struts 26 are connected to the lateral ends 62 of the thrust strut balance yoke 58, or more Preferably, to forwardly extending protrusions thereof, by pins retained within spherical bearings or any other suitable means. Preferably, the connection is by means of a clevis arrangement to allow the thrust struts 26 and the balance yoke 58 to pivot relative to each other to compensate for variations in the thrust transmitted by each of the thrust struts 26. For each thrust strut 26, the clevis arrangement has a pair of lugs on one of the thrust strut 26 and the yoke 58, and a single lug on the other that sits between the pair of lugs. A pivot pin is inserted through aligned apertures, with a spherical bearing therein, to secure the thrust strut 26 and yoke 58 pivotably together.

The primary mount block 30 also has a recess or aperture 64 in an upper surface (radially outer surface) of the central portion 44 to receive, in use, a thrust shear pin from the aircraft pylon. The recess 64 may be positioned at any suitable location or there may be more than one recess 64 provided symmetrically across the primary mount block 30 for an equivalent number of shear pins.

The secondary mount block 32 can be more clearly seen in FIG. 5 and FIG. 6 in two perspective views, one from above and one from below. The upper surface 66 of the secondary mount block 32 is substantially planar and arranged to abut the lower surface (radially inner surface) of the primary mount block 30. There are apertures 68 (only some are indicated for clarity) provided through the secondary mount block 32 in an equally spaced row parallel to each lateral edge of the secondary mount block 32. These apertures 68 align with the apertures 48 in the primary mount block 30 to receive the attachment bolts 50 to secure the mount blocks 30, 32 together and thence to the pylon. Additional apertures or recesses 70 may be provided inwardly of the lateral edges of the secondary mount block 32 to receive additional fixings 72 (FIG. 3) to secure the two mount blocks 30, 32 together.

The secondary mount block 32 includes a cutaway section 74 in its forward edge to accommodate, in use, the tongue 42 of the primary mount block 30. On either lateral side of this cutaway section 74 there are catcher devises 76 has a pair of lugs as is well known for a clevis. Each catcher clevis 76 includes an aperture 78 through its lugs. The catcher devises 76 are arranged to receive, in use, the balance yoke 58 between its lugs. There are apertures provided in the balance yoke 58 to align with the apertures 78 in the catcher devises 76. A pivot pin (not shown) is inserted through each aperture arrangement to hold the components in pivotable relation. The apertures 78 through the catcher devises 76 are provided with a clearance gap around their pivot pins so that no load is transferred through them during normal operation of the rear engine mounting apparatus 22.

In the event of a failure of the tongue 42 of the primary mount block 30, the clearance around the pivot pins through the catcher devises 76 is taken up and engine loads are transferred from the balance yoke 58, through the catcher devises 76 and thence to the aircraft pylon in the alternative load path.

The upper (radially outer) surface 66 of the secondary mount block 32 also includes a pair of raised sections 80 at the lateral edges of the secondary mount block 32 arranged to sit within corresponding cutaway portions 82 in the lateral edges of the primary mount block 30. These raised sections 80 each have a recess or aperture 84 to receive, in use, a secondary shear pin from the pylon (not shown). These shear pins become loaded in the event of the failure of a component in the primary load path and substitution of the alternative load path but are not loaded during normal operation of the rear engine mounting apparatus 22 since no load is transferred through the secondary mount block 32. Alternative embodiments of the present invention do not comprise the raised sections 80 in the secondary mount block 32 and complementary recesses 84 in the primary mount block 30. Instead the primary and secondary mount blocks 30, 32 simply abut. In a further embodiment, the primary mount block 30 consists of the central portion 44 but not the main portion 46. Thus, part of the upper surface 66 of the secondary mount block 32 is directly exposed to the pylon rather than abutting the primary mount block 30. In this case the upper surface 66 may be raised over substantially its whole surface instead of having smaller raised sections 80 as illustrated in FIG. 5.

The rear edge of the secondary mount block 32 may be profiled in such a way that the axial length of the secondary mount block 32 is greater towards the lateral edges than at its centre. This provides a reduction in the weight of the component without compromising its strength.

Figure 4:
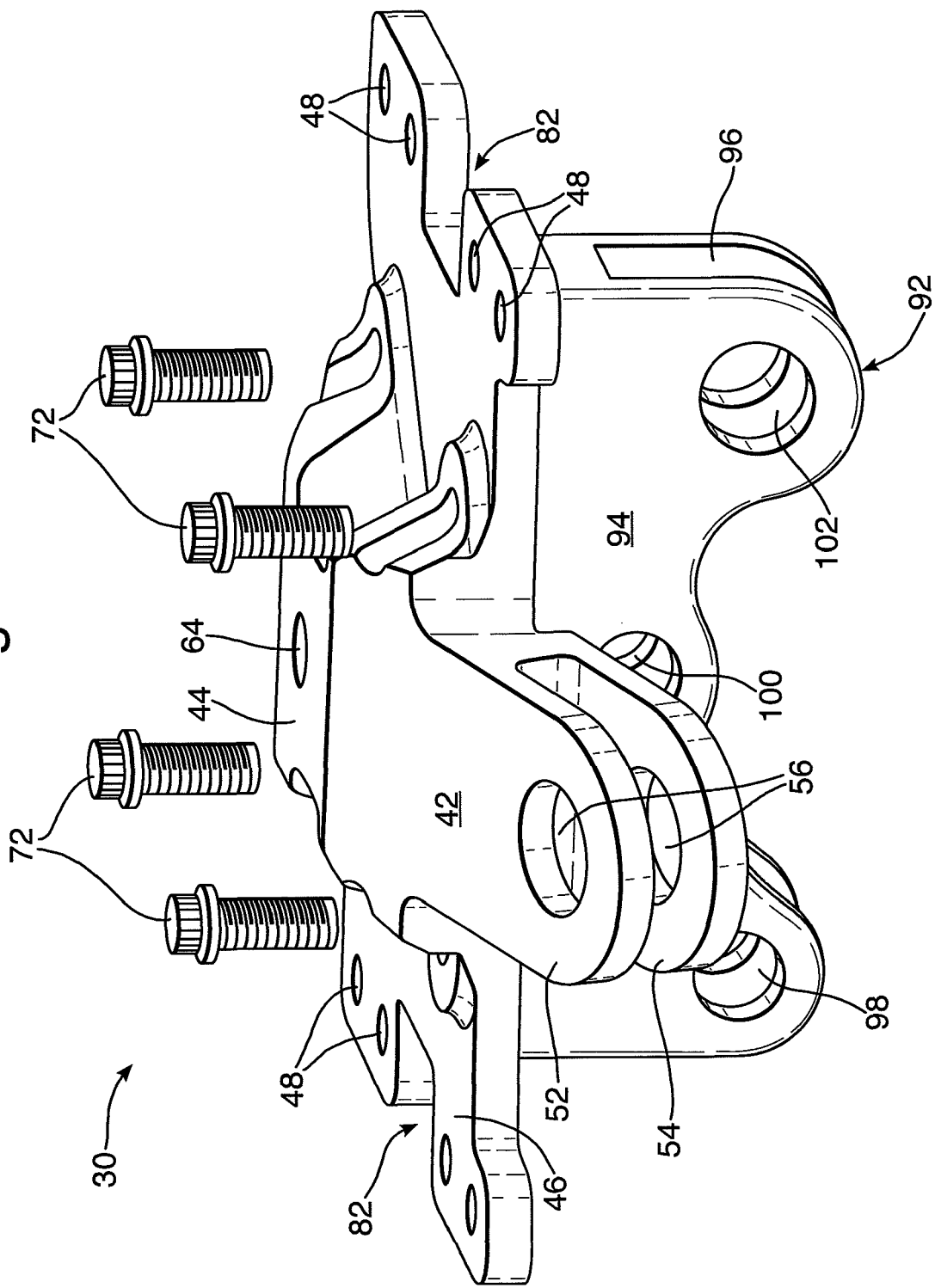
FIG. 4 is a perspective view of the primary mount block of the rear engine mounting arrangement according to the present invention.

FIG. 4 shows a clevis 92 defined between primary forward and rear walls 94, 96 extending from the lower surface of the primary mount block 30 towards the engine 210 (not shown). Similarly, FIG. 6, a clevis 86 is defined between secondary forward and rear walls 88, 90 extending from the lower surface of the secondary mount block 32. The secondary forward and rear walls 88, 90 are spaced to receive the primary forward and rear walls 94, 96 slotted between them to form a double clevis. Preferably, the profile of each of the forward and rear walls 88, 90, 94, 96 is the same.

The primary forward and rear walls 94, 96 define three apertures 98, 100, 102 which are arranged to receive a pivot pin (not shown) through each. The secondary forward and rear walls 88, 90 are laterally wider than the primary forward and rear walls 94, 96 and define five apertures 104, 106, 108, 110, 112. The central three apertures 106, 108, 110 align respectively with the apertures 98, 100, 102 in the primary forward and rear walls 94, 96.

The engine attachment links 34, 36, 38 each have one or two apertures through their upper ends which, when the links 34, 36, 38 are positioned in the double clevis formed by the primary forward and rear walls 94, 96 and secondary forward and rear walls 88, 90, align with the apertures 98, 100, 102, 104, 106, 108, 110, 112. Pivot pins are inserted through each aperture or aperture set: 104; 106, 98; 108, 100; 110, 102; 112. Thus the pivot pins interconnect the engine attachment links 34, 36, 38 within the double clevis formed by the primary forward and rear walls 94, 96 and secondary forward and rear walls 88, 90 so that the engine loads can be transferred from the engine 210, through the links 34, 36, 38, via the primary and secondary mount blocks 30, 32 and thence into the aircraft pylon.

The engine attachment links 34, 36, 38 can take any suitable form as known in the art that provide redundancy for all single pivot pin, link or clevis failures or for failure of any adjacent pair. This redundancy relies on the connections to the secondary mount block 32 only. The connections to the primary mount block 30 provide additional redundancy for complete failure of the secondary mount block 32. The connection arrangement also provides a quick and simple method of detecting a failure case without requiring removal of the rear engine mounting arrangement 22. If the pivot pins located through the aperture pairs 106, 98; 108, 100 are able to rotate freely (unloaded) there is no failure. If one or both of these pivot pins is loaded, and therefore unable to rotate freely, there has been a failure and the rear engine mounting arrangement 22 should be removed, dismantled and repaired or replaced.

The various connections have primarily been described as clevis arrangements having a pair of lugs on one component and a single lug forming part of the other component to seat between the pair of lugs. However, the connections could equally be formed by providing the pair of lugs on the other component, or by providing a pair of lugs on each component forming an interleaving connection. Alternatively a single lug could be provided on each component. This reduces the weight of the components but removes some redundancy from the system. For example, the primary rear wall 96 could be omitted so that the apertures 98, 100 and 102 are defined through only the primary forward wall 94, or vice versa. In another example, the catcher devises 76 could include single lugs to be secured via pivot pins to the balance yoke 58 or the tongue 42 could comprise a single lug to be secured to the balance yoke 58.

In another alternative arrangement, a different system of connection could be substituted for any of the clevis arrangements hereinbefore described.

Although the engine mounting arrangement of the present invention has been described as a rear mounting apparatus, it could alternatively be a front engine mounting apparatus.

The central portion 44 of the primary mount block 30 may be integral with the main portion 46 thereof. Alternatively it may comprise a separate component with suitable connection therebetween. Preferably, the bolts 72 could simultaneously secure the central and main portions 44, 46 of the primary mount block 30 to each other and to the secondary mount block 32.

Preferably, two catcher devises 76 are provided to transfer the thrust loads from the engine 210 via the balance yoke 58 in the event of a failure of a component in the normal load path. This provides the additional advantage that the thrust loads continue to be balanced by minor movements of the balance yoke 58. However, other arrangements comprising a single, or more than two, catcher devises 76 are contemplated within the scope of the present invention.

Similarly, although specific numbers of attachment apertures 48, 68 and complementary bolts 50 are described above, more or fewer apertures and bolts may be more appropriate in connecting other specific engines to specific aircraft pylons.

What is claimed is:

1. An aircraft engine mounting apparatus comprising:
    a balance yoke;
    thrust struts connected to the balance yoke;
    a primary block, having at least one thrust load connection extending from and connected to the balance yoke for transferring thrust loads from an engine during normal operation of the engine mounting apparatus; and
    a secondary mount block, distinct from the primary block, connected to the balance yoke via at least one thrust load catcher connection, the thrust load catcher connection being unloaded during normal operation of the engine mounting apparatus for transferring thrust loads from the engine in the event of a failure condition of the primary mount block.

2. An engine mounting arrangement as claimed in claim 1 wherein the primary and secondary mount blocks are secured together.

3. An engine mounting arrangement as claim in claim 1 wherein the primary mount block comprises a single thrust load connection.

4. An engine mounting arrangement as claimed in claim 1 wherein the arrangement further comprises at least one engine attachment link, each of the primary and secondary mount blocks having means of connection to the at least one engine attachment link.

5. An engine mounting arrangement as claimed in claim 4 wherein at least part of the means of connection of the primary and secondary mount blocks connects to a common part of the at least one engine attachment link.

6. An engine mounting arrangement as claimed in claim 1 wherein the thrust load connection comprises a clevis arrangement having two lugs.

7. An engine mounting arrangement as claimed in claim 1 wherein the thrust load connection comprises a single lug.

8. An engine mounting arrangement as claimed in claim 1 wherein the thrust load catcher connection comprises a clevis arrangement having two lugs.

9. An engine mounting arrangement as claimed in claim 1 wherein the thrust load catcher connection comprises a single lug.

10. An engine mounting arrangement as claimed in claim 1 wherein there are two thrust load catcher connections arranged to transfer the thrust loads from the engine, either separately or in unison during a failure condition of the primary mount block.

11. An engine mounting arrangement as claimed in claim 1 wherein the at least one thrust load catcher connection defines a clearance with respect to the balance yoke so that no load passes therethrough during normal operation of the engine mounting arrangement.

* * * * *